| United States Patent [19] | [11] Patent Number: 4,653,818 |
| DeBruyn | [45] Date of Patent: Mar. 31, 1987 |

[54] APPARATUS FOR ORGANIZING STORAGE CONTAINERS IN A CABINET

[75] Inventor: William DeBruyn, Rockford, Ill.

[73] Assignee: Amerock Corporation, Rockford, Ill.

[21] Appl. No.: 708,066

[22] Filed: Mar. 4, 1985

[51] Int. Cl.⁴ .............................................. A47F 5/08
[52] U.S. Cl. .................... 312/246; 312/301; 312/335; 312/345; 312/350; 248/317; 211/113
[58] Field of Search ............. 312/246, 301, 345, 335, 312/350, 245, 273; 211/11, 113; 248/317, 342

[56] References Cited

U.S. PATENT DOCUMENTS

| 2,870,904 | 1/1959 | Tarbox | 312/273 |
| 2,984,533 | 5/1961 | Sundberg | 312/345 X |
| 3,017,037 | 1/1962 | McDonnell | 211/113 |
| 3,970,010 | 7/1976 | Cantley | 312/301 |
| 4,231,626 | 11/1980 | Amtmann et al. | 312/245 |

FOREIGN PATENT DOCUMENTS 0849145 9/1960 United Kingdom ................ 312/335

Primary Examiner—Kenneth J. Dorner
Assistant Examiner—Gerald A. Anderson
Attorney, Agent, or Firm—Leydig, Voit & Mayer, Ltd.

[57] ABSTRACT

Dry food storage containers of various sizes are supported by hanger plates which form part of a rack adapted to be slid into and out of a cabinet. When the rack is slid out of the cabinet, the containers may be laterally removed from or laterally inserted into the rack without interference from the cabinet.

12 Claims, 6 Drawing Figures

U.S. Patent  Mar. 31, 1987  Sheet 1 of 2  4,653,818
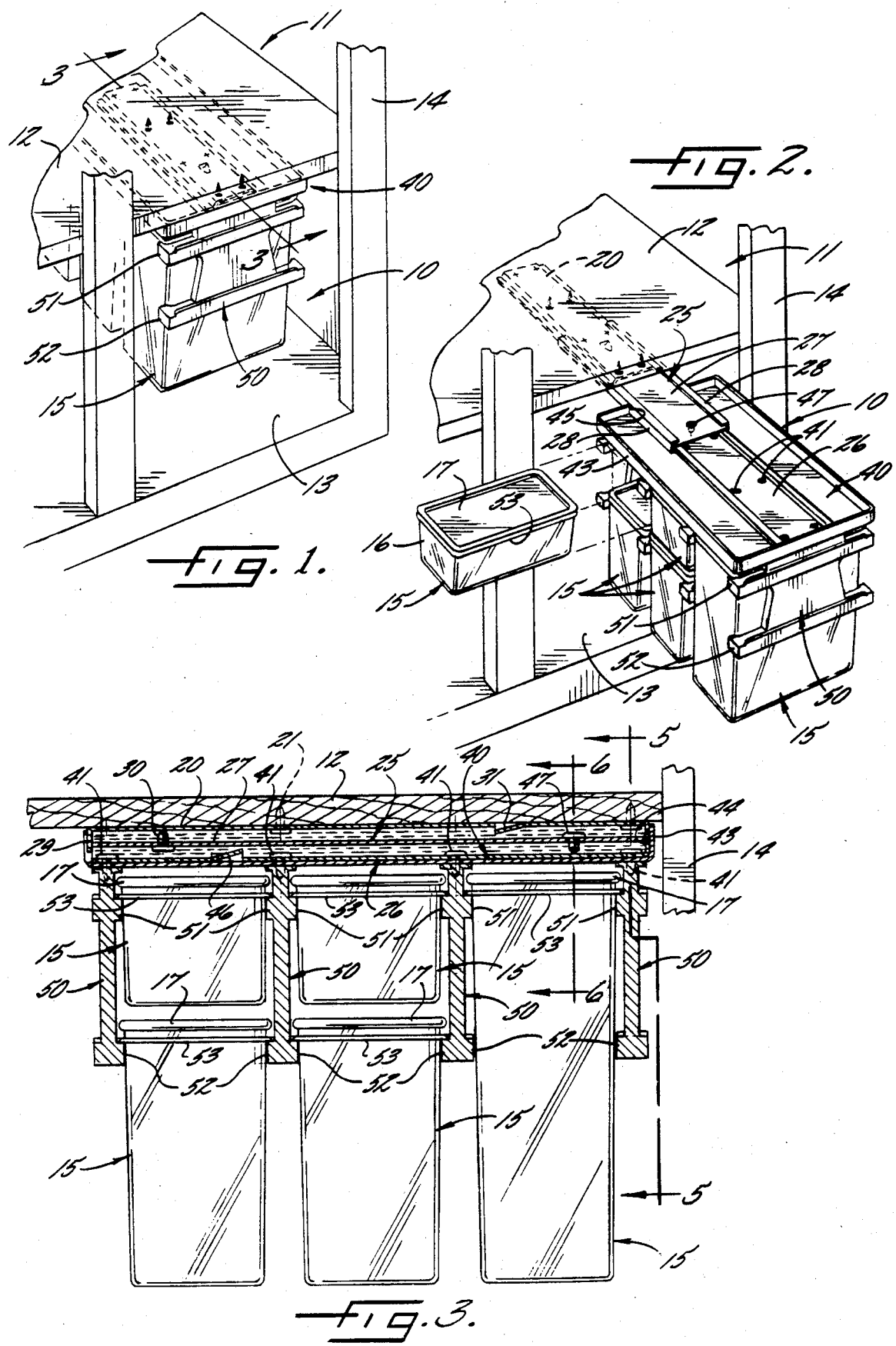

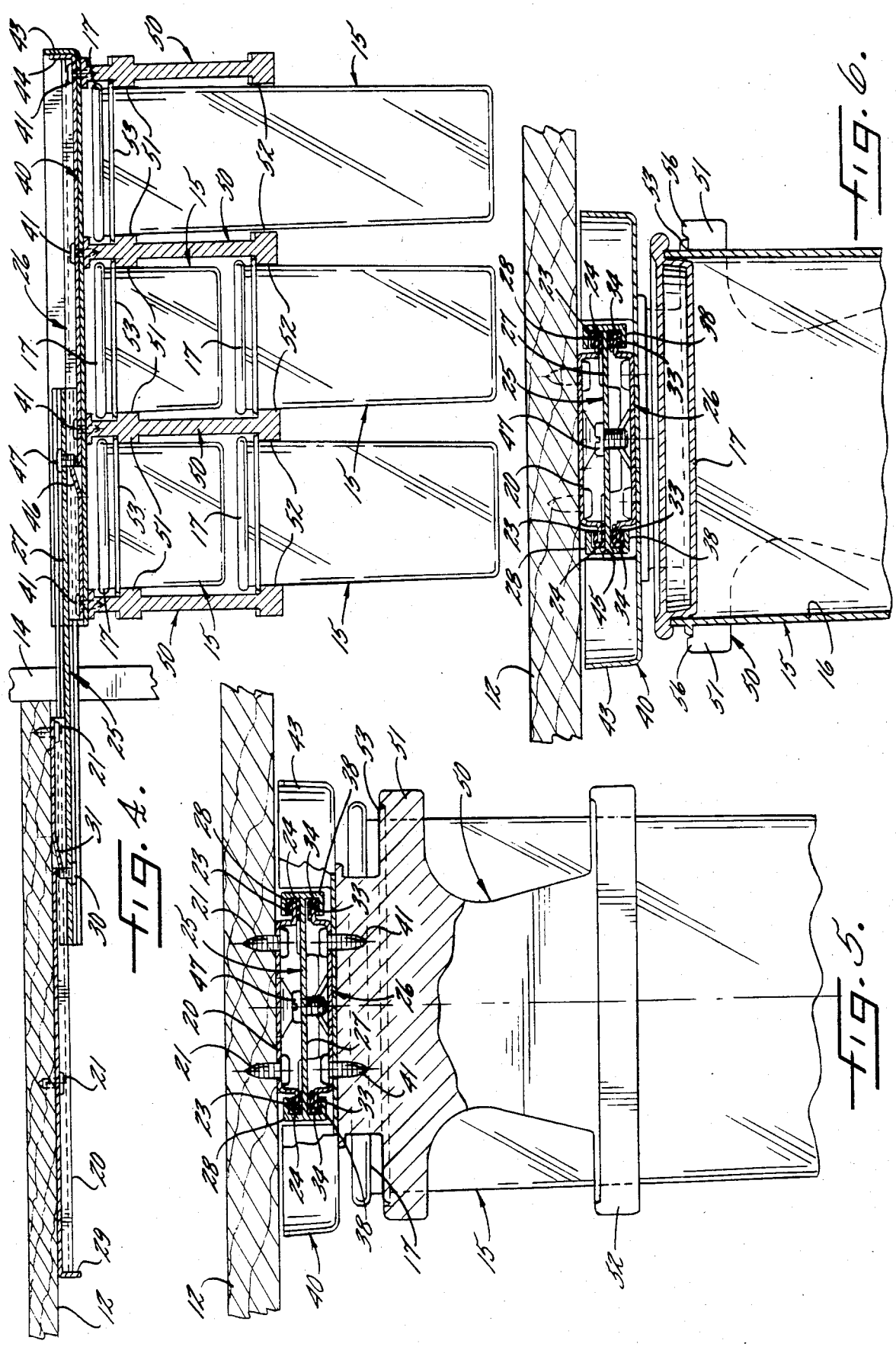

APPARATUS FOR ORGANIZING STORAGE CONTAINERS IN A CABINET

BACKGROUND OF THE INVENTION

This invention relates to apparatus for assisting in organizing a cabinet such as a kitchen cabinet. More specifically, the invention relates to apparatus having reusable moisture-resistant containers for storing dry food products such as cereal or the like and to apparatus for keeping the containers neatly arranged and organized in the cabinet.

SUMMARY OF THE INVENTION

The general aim of the present invention is to provide a new and improved container organizer in the form of a rack which keeps the containers neatly stored in the cabinet, which may be easily slid forwardly out of the cabinet to a fully accessible position and which, when in the accessible position, enables the containers to be easily removed from and re-inserted into the rack.

A more detailed object of the invention is to achieve the foregoing by providing a slide in-slide out rack having unique hangers which enable a plurality of containers to be laterally removed from or laterally inserted into the rack without interference from the cabinet.

Another object is to provide a novel organizer rack which may be slid to a fully accessible position outside of the cabinet while still being solidly supported by the cabinet.

The invention also resides in the unique construction of the hangers and the containers to enable the containers to be held securely by the hangers and to permit containers of different sizes to be stored compactly in the rack.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view of a typical cabinet equipped with a new and improved container organizer incorporating the unique features of the present invention, the organizer being shown in a stored position in the cabinet.

FIG. 2 is a perspective view similar to FIG. 1 but shows the organizer slid outwardly from the cabinet to an accessible position.

FIG. 3 is an enlarged fragmentary cross-section taken substantially along the line 3—3 of FIG. 1.

FIG. 4 is a fragmentary cross-section similar to FIG. 3 but shows the organizer slid outwardly from the cabinet.

FIGS. 5 and 6 are enlarged fragmentary cross-sections taken substantially along the lines 5—5 and 6—6, respectively, of FIG. 3.

DETAILED DESCRIPTION OF THE PREFERRED EMBODIMENT

For purposes of illustration, the organizer 10 of the present invention is shown in the drawings in conjunction with a kitchen cabinet 11 having a horizontal shelf 12 spaced upwardly from the bottom wall 13 of the cabinet and having a face frame 14 defining a front opening in the cabinet, the opening normally being closed by a hinged door (not shown). The purpose of the organizer is to enable containers 15 to be stored in a neatly organized arrangement in the cabinet 11.

The containers 15 herein are made of plastic and are especially suitable for storing dry food products such as cereal, pasta, meal and the like so as to keep the product free of moisture and bugs. Each container includes a body 16 (FIG. 6) adapted to be closed and sealed by a plug-type lid 17.

In accordance with the present invention, the organizer 10 is in the form of a rack which is adapted to slide into and out of the cabinet 11. The rack 10 carries the containers 15 in a unique manner enabling the containers to be laterally removed from and laterally re-inserted into the rack when the latter is slid outwardly from the cabinet. In addition, the rack is adapted to hold and store containers of various sizes in a very compact arrangement which effectively utilizes the available space in the cabinet.

The rack 10 is supported within the cabinet 11 by a guide which is in the form of a front-to-rear extending track 20 (FIGS. 3 to 6) made of sheet metal. The track is located directly beneath the lower side of the shelf 12 and is secured to the shelf by screws 21. As shown in FIG. 5, the track is formed with an inverted U-shaped cross-section and includes two laterally projecting flanges 23 which are covered by plastic anti-friction wear strips 24.

Inner and outer carriers 25 and 26 support the rack 10 on the guide track 20 to enable the rack to be moved fully into and fully out of the cabinet 11 and to provide a strong cantilevered support for the rack when the latter is located fully out of the cabinet as shown in FIGS. 2 and 4. Herein, the inner carrier 25 comprises a central front-to-rear extending plate 27 which underlies the guide track 20. Upper C-shaped channels 28 (FIG. 5) are formed on the upper side of the plate 27 adjacent the lateral side edges thereof and are adapted to slide back and forth along the wear strips 24 of the flanges 23 of the track 20. Inward sliding of the inner carrier 25 is stopped when the rear edge of the plate 27 engages a depending flange 29 on the rear end of the track 20 as shown in FIG. 3. To stop outward sliding of the inner carrier 25, a screw 30 is threaded upwardly through the rear end portion of the inner carrier and is adapted to engage a tongue 31 which is struck downwardly from the forward end portion of the track 20 (see FIG. 4).

The outer carrier 26 is a duplicate of the track 20 when the latter is inverted and turned end-for-end, the track and the outer carrier thus being capable of being made by the same tooling. Accordingly, the outer carrier 26 is of U-shaped cross-section and includes laterally extending flanges 33 (FIG. 5) with wear strips 34. The wear strips are adapted to slide back and forth within lower C-shaped channels 38 depending from the lateral side edges of the plate 27 of the inner carrier 25.

As shown in FIGS. 2 and 5, the rack 10 includes an overhead support member or cover 40 which underlies the outer carrier 26. The cover 40 is made of plastic and is attached to the outer carrier 26 by four pairs of laterally spaced screws 41, the four pairs being spaced from one another along the length of the carrier. An upwardly projecting flange 43 is formed around the periphery of the cover and, along its forward side, engages a flange 44 which is turned upwardly from the forward end of the outer carrier 26. A notch 45 (FIG. 6) is formed in the rear side of the flange 43 to enable the carriers 25 and 26 to project through the flange 43 and into overlying engagement with the cover 40.

When the rack 10 is in its stored position in the cabinet 11 as shown in FIG. 3, the inner carrier 25 directly underlies the guide track 20 while the outer carrier 26 directly underlies the inner carrier, the track and the carriers thus being in a compactly nested relation. When the rack is pulled outwardly of the cabinet to its accessible position shown in FIGS. 2 and 4, the outer carrier 26 first slides outwardly along the inner carrier 25 until a tongue 46 struck upwardly from the rear end portion of the outer carrier engages a screw 47 threaded downwardly through the forward end portion of the plate 27 of the inner carrier 25 (see FIG. 5). Thereafter, further outward pulling of the rack 10 causes the inner carrier 25 to slide outwardly along the track 20 until the screw 30 engages the tongue 31 as shown in FIG. 5. In the full outward position of the rack, both the rack and the outer carrier 26 are located completely outside of the cabinet while about one-half of the length of the inner carrier 25 projects outwardly from the cabinet. The combination of the two carriers 25 and 26 with the track 20 enables the rack 10 to be pulled completely out of the cabinet and yet provides a strong, solid and stable cantilevered support for the rack when the latter is fully outside of the cabinet.

Inward pushing of the rack 10 causes the outer carrier 26 to slide inwardly along the inner carrier 25 until the flange 44 engages the forward end of the inner carrier. Thereafter, continued pushing of the rack causes the inner carrier 25 to slide inwardly along the track 20 until the inner end of the inner carrier engages the flange 29.

In carrying out the invention, at least three, and preferably four, hangers 50 are attached to the cover 40 in depending relation therefrom and are adapted to support the containers 15 when the latter are inserted laterally between the hangers. The four hangers are identical to one another and generally are in the form of upright plate-like members which herein are made of plastic. The four hangers are spaced from one another from front-to-rear along the underside of the cover 40 and are fastened to the latter by the same screws 41 which fasten the cover to the outer carrier 26. Each hanger extends laterally of the cover and has approximately the same width as the cover.

Further in keeping with the invention, the sides of the hangers 50 are formed with means which coact with means on the containers 15 to support the containers on the hangers while enabling the containers to be laterally inserted between and laterally removed from the hangers. Specifically, each side of each hanger is formed with an upper laterally extending flange 51 adjacent the upper end of the hanger and with a lower laterally extending flange 52 near the extreme lower end of the hanger. Thus, flanges on adjacent sides of adjacent hangers project toward one another and define means by which the containers 15 may be supported from the hangers. The coacting means on the containers comprise an outwardly projecting peripheral flange or bead 53 formed integrally with each container body 16 adjacent the upper end thereof. When a container 15 is inserted into a space between two hangers 50, the container bead 53 rests either on the upper flanges 51 or on the lower flanges 52 to support the container on the hangers. To restrict the containers against sliding laterally off of the flanges 51, 52, the ends of each of the latter flanges are formed with upwardly projecting lugs 56 (FIG. 6) adapted to engage the container bead 53 and restrict free sliding of the container. When the container is lifted slightly, the bead 53 moves clear of the lugs 56 to free the container for lateral removal from the rack 10.

Advantageously, the sets of upper and lower flanges 51 and 52 enable containers of different heights to be stored compactly by the rack 10. For example, and as shown in FIG. 3, a tall container may be stored in the compartment between the front two hangers 50 by hanging the container from the upper flanges 51. Each of the remaining two compartments may store a short container held on the upper flanges 51 and also may store a container of intermediate height immediately below the short container and held by the lower flanges 52. The rack 10 thus provides extreme flexibility both in the size of the containers adapted to be stored by the rack and in the different arrangements in which the various sized containers may be organized.

I claim:

1. Apparatus for organizing a cabinet having a horizontal shelf and having a front opening, said apparatus comprising a fixed guide, means for fastening said guide to the underside of the shelf with the guide extending from front-to-rear beneath the shelf, a horizontal support member connected to said guide and movable into and out of said cabinet between a stored position and an accessible position, at least three hangers attached to and depending from said support member and spaced from one another from front-to-rear along said support member, upright storage containers sized for lateral insertion into the spaces between said hangers, the spaces between said hangers being open in both lateral directions and also being open downwardly whereby containers of various heights may be inserted laterally into said spaces from either direction, and coating means on adjacent sides of adjacent hangers and on the upper end portions of said storage containers for suspending said containers in hanging relation from said hangers when said containers are inserted between said hangers, said hangers and the containers suspended therefrom being located completely outside of said cabinet when said support member is located in said accessible position whereby said containers may be removed laterally from between said hangers.

2. Apparatus as defined in claim 1 further including an inner front-to-rear extending carrier supported by said guide to move forwardly and rearwardly within said cabinet and to extend outwardly from said cabinet by a predetermined distance, an outer front-to-rear extending carrier supported by said inner carrier to move forwardly and rearwardly within said cabinet and to extend outwardly from said cabinet by a greater distance, said support member being attached to said outer carrier and being movable therewith between said stored position and said accessible position, said support member and said carriers being disposed completely within said cabinet when said support member is in said stored position.

3. Apparatus as defined in claim 2 in which said outer carrier is a duplicate of said guide when said outer carrier is inverted and is turned end-for-end.

4. Apparatus as defined in claim 2 in which said support member and each of said carriers comprises a front-to-rear extending plate disposed in a generally horizontal plane beneath said shelf.

5. Apparatus as defined in claim 1 in which said hangers comprise plates which extend laterally of said support member, said coacting means comprising laterally extending flanges projecting toward one another from adjacent sides of adjacent plates and further comprising flanges on said containers adjacent the upper ends thereof and supported slidably on said hanger flanges to suspend said containers in hanging relation from said hanger flanges.

6. Apparatus as defined in claim 5 further including upwardly projecting means on each end of each of said hanger flanges and engageable with said container flanges to restrict outward lateral sliding of said containers along said hanger flanges.

7. Apparatus as defined in claim 4 in which adjacent sides of adjacent hanger plates each includes vertically spaced upper and lower flanges, one of said containers being a tall container supported by one pair of upper flanges, one of said containers being a short container supported by a second pair of upper flanges, and another one of said containers being of intermediate height and being supported immediately below said short container by a pair of lower flanges.

8. Apparatus as defined in claim 7 in which each of said containers comprises a body and a top closure, the flanges on said containers extending around the upper end portions of the bodies of the containers.

9. Apparatus as defined in claim 5 in which each of said containers includes front and rear sides and in which said flanges have edges, the front-to-rear dimension between the edges of the flanges on the front and rear sides of each container being greater than the front-to-rear dimension between the adjacent sides of the hanger flanges from which the container is suspended, the front-to-rear dimension of all portions of each container below the container flanges being less than the front-to-rear dimension between the adjacent sides of such hanger flanges.

10. Apparatus for organizing a cabinet having a horizontal shelf and having a front opening, said apparatus comprising a fixed guide, means for fastening said guide to the underside of the shelf with the guide extending from front-to-rear beneath the shelf, an inner front-to-rear extending carrier supported by said guide to move forwardly and rearwardly within said cabinet beneath said guide, an outer front-to-rear extending carrier supported by said inner carrier to move forwardly and rearwardly relative to said inner carrier and to move into and out of said cabinet, a front-to-rear extending horizontal support member attached to said outer carrier and projecting laterally beyond the sides thereof, said support member being movable with said outer carrier between a stored position within the cabinet and an accessible position outside of the cabinet, at least three hanger plates attached to and depending from said support member and extending laterally of the support member, said hanger plates being spaced from one another from front-to-rear beneath said support member, adjacent sides of adjacent hanger plates having laterally extending flanges projecting toward one another, and upright storage containers sized for lateral insertion in the spaces between said hanger plates, the spaces between said hanger plates being open in both lateral directions and also being open downwardly whereby containers of various heights may be inserted laterally into said spaces from either direction, said storage containers having flanges adjacent the upper ends thereof and suspended in hanging relation from said hanger flanges when said containers are located between said hanger plates, said hanger plates and the containers suspended therefrom being located completely outside of said cabinet when said support member is located in said accessible position whereby said containers may be removed laterally from between said hanger plates.

11. Apparatus as defined in claim 10 in which each of said containers includes front and rear sides and in which said flanges have edges, the front-to-rear dimension between the edges of the flanges on the front and rear sides of each container being greater than the front-to-rear dimension between the adjacent sides of the hanger flanges from which the container is suspended, the front-to-rear dimension of all portions of each container below the container flanges being less than the front-to-rear dimension between the adjacent sides of such hanger flanges.

12. Apparatus as defined in claim 10 in which said support member and each of said carriers comprises a front-to-rear extending plate disposed in a generally horizontal plane beneath said shelf.

* * * * *